United States Patent
Nakanuma (10) Patent No.: US 11,146,550 B2
(45) Date of Patent: Oct. 12, 2021

(54) COMMUNICATION LINE MUTUAL AUTHENTICATION SYSTEM IN IP NETWORK

(71) Applicant: Koga Electronics Co., Ltd., Koka (JP)

(72) Inventor: Tadashi Nakanuma, Koka (JP)

(73) Assignee: Koga Electronics Co., Ltd., Shiga (JP)

( * ) Notice: Subject to any disclaimer, the term of this patent is extended or adjusted under 35 U.S.C. 154(b) by 0 days.

(21) Appl. No.: 16/961,295

(22) PCT Filed: Oct. 16, 2018

(86) PCT No.: PCT/JP2018/038522
§ 371 (c)(1),
(2) Date: Jul. 10, 2020

(87) PCT Pub. No.: WO2019/146182
PCT Pub. Date: Aug. 1, 2019

(65) Prior Publication Data
US 2021/0084037 A1 Mar. 18, 2021

(30) Foreign Application Priority Data
Jan. 23, 2018 (JP) .............................. JP2018-009018

(51) Int. Cl.
*H04L 29/06* (2006.01)
(52) U.S. Cl.
CPC .......... *H04L 63/0869* (2013.01); *H04L 63/14* (2013.01); *H04L 63/10* (2013.01)
(58) Field of Classification Search
CPC ...... H04L 63/0869; H04L 63/14; H04L 63/10
See application file for complete search history.

(56) References Cited

U.S. PATENT DOCUMENTS

2006/0029000 A1* 2/2006 Waldvogel .............. H04L 69/16
370/254
2010/0217990 A1* 8/2010 Abe ....................... H04L 9/3247
713/176

FOREIGN PATENT DOCUMENTS

JP    2005-122695 A    5/2005
JP    2005-193590 A    7/2005
(Continued)

OTHER PUBLICATIONS

International Search Report for corresponding Application No. PCT/JP2018/038522, dated Jan. 8, 2019.

*Primary Examiner* — Huan V Doan
(74) *Attorney, Agent, or Firm* — Renner, Otto, Boisselle & Sklar, LLP (57) ABSTRACT

A system for determining whether spoofing occurs at an activating communication line under the condition that a connection by three-way handshake can be established between activating and activated communication lines regardless of the spoofing. Authentication units are arranged above communication terminal devices respectively. While a three-way handshake is executed once between the communication terminal devices, a three-way handshake is executed twice between the associated communication lines. One communication line activates the other communication line, and when a connection by a first three-way handshake is established between the communication lines, the connection is disconnected. Thereafter, it is determined at the activating communication line whether a SYN(2) is sent from the activated communication line at a predetermined timing, while it is determined at the activated communication line whether a SYN+ACK(2) as a response to the SYN(2) is reached or not from the activating communication line, thereby the communication lines are mutually authenticated.

1 Claim, 3 Drawing Sheets (56) References Cited

FOREIGN PATENT DOCUMENTS

| | | |
|---|---|---|
| JP | 2015-128230 A | 7/2015 |
| JP | 2015-170220 A | 9/2015 |
| WO | 2006/129474 A1 | 12/2006 |

* cited by examiner

COMMUNICATION LINE MUTUAL AUTHENTICATION SYSTEM IN IP NETWORK

TECHNICAL FIELD

The present invention relates to a system authenticating mutual communication lines between activating and activated communication terminal devices which are uniquely connected to each other by a three-way handshake based on unique identification numbers, the activating and activated communication terminal devices being connected to an IP network through the communication lines to each of which the identification number is assigned.

BACKGROUND ART

In recent years, M2M systems such as an automatic meter reading system for a gas meter or a water meter, a smart grid, a HEMS (Home Energy Management System), a remote monitoring system, and a sensor system and so on have become widespread. According to the M2M systems, machines are connected to each other through a communication network, and self-sustained monitoring and control, etc. are achieved.

In these M2M systems, normally, a central communication device (one machine) and one or more communication terminals (the other machine) are connected to an IP network through communication lines to each of which a unique identification number (IP address) is assigned.

Then the communication line of the central communication device and the communication lines of one or more communication terminals are uniquely connected to each other by a three-way handshake based on the IP addresses so that data communication is performed between the central communication device and the one or more communication devices.

By the way, because the data communication in the IP network is normally performed through a plurality of communication relay devices, the data communication in the IP network has a problem of impersonation of IP address of an activating communication line, that is, a problem of spoofing.

That is to say, according to the function of TCP/IP, originally, when a SYN packet is sent to an activated communication line from an activating communication line at which the impersonation of IP address occurs, a three-way handshake sequence is not executed between the activating and activated communication lines because the activated communication line sends a SYN+ACK packet as a response to a true communication line assigned to the IP address. On the other hand, "spoofing of communication line" is performed by establishing a connection by three-way handshake between an impersonated activating communication line and an activated communication line, specifically, by sending a SYN packet with embedded forged IP address from the activating communication line to the activated communication line in such a way that a SYN+ACK packet as a response is sent from the activated communication line to the impersonated activation communication line.

The "spoofing of communication line" can be easily performed by means of known methods such as source routing or TCP sequence number prediction, or by modifying a function of a router and so on.

In the prior art, in order to prevent the damage of the spoofing and protect the data sent and received between the devices, a method of authenticating devices by generating an authentication key at every communication (see, for example, Patent Document 1) and a method of encrypting communications (see, for example, Patent Document 2) has been proposed so far.

Furthermore, in the prior art, there exists a method of disconnecting a connection in the middle of data communication and thereafter making a call back connection (see, for example, Patent Document 3), or a method of checking whether an activating communication line has an IP address allowed to connect to an activated communication line (see, for example, Patent Document 4), or a method of establishing a connection by three-way handshake (see, for example, Patent Document 5).

However, in the prior art, it is necessary to provide a complicated and high-cost system for generation of the authentication key or encryption, and furthermore if the authentication key would be leaked or the secret code would be decoded, there is a possibility that secure data transmission cannot be guaranteed.

Further, in such prior art, the spoofing may have been caused at activation of a communication line, but no such situation is supposed and it is impossible to determine whether the spoofing occurs or not, so that there was a risk that secure data transmission could not be guaranteed.

PRIOR ART DOCUMENTS

Patent Documents

Patent Document 1: JP 2015-170220 A
Patent Document 2: JP 2015-128230 A
Patent Document 3: WO 2006/129474
Patent Document 4: JP 2005-193590 A
Patent Document 5: JP 2005-122695 A

SUMMARY OF THE INVENTION

Problems to be Solved by the Invention

It is, therefore, an object of the present invention to provide an authentication system capable of determining whether the spoofing occurs or not at an activating communication line under the condition that the connection by three-way handshake can be always established between the activating and activated communication lines regardless of the spoofing.

Means for Solving the Problems

In order to solve the object, the present invention provides a system authenticating mutual communication lines between activating and activated communication terminal devices which are connected to an IP network through the communication lines with unique identification numbers and uniquely connected to each other by a three-way handshake based on the identification numbers, wherein the system comprises: an activating-side authentication unit arranged between the activating communication terminal device and the activating communication line so as to authenticate the activated communication line; and an activated-side authentication unit arranged between the activated communication terminal device and the activated communication line so as to authenticate the activating communication line, wherein the activating-side authentication unit has an activating-side line input/output section connected to the activating communication line so as to communicate with the activating communication line, an activating-side terminal input/output section connected to the activating communication terminal device so as to communicate with the activating communication terminal device, an activating-side sequence control section controlling a three-way handshake sequence between the activating and activated communication lines and authenticating the activated communication line, an activating-side packet relay section arranged at a bus which connects the activating-side line input/output section and the activating-side terminal input/output section, and connected to the activating-side sequence control section so as to relay packets other than packets of a three-way handshake sent and received between the activating and activated communication lines on the one hand and have an exchange of the packets of the three-way handshake with the activating-side sequence control section on the other hand, and an activating-side packet storage section storing the data of the packets of the three-way handshake sent and received between the activating-side packet relay section and the activating-side sequence control section, wherein the activated-side authentication unit has an activated-side line input/output section connected to the activated communication line so as to communicate with the activated communication line, an activated-side terminal input/output section connected to the activated communication terminal device so as to communicate with the activated communication terminal device, an activated-side sequence control section controlling a three-way handshake sequence between the activating and activated communication lines and authenticating the activating communication line, an activated-side packet relay section arranged at a bus which connects the activated-side line input/output section and the activated-side terminal input/output section, and connected to the activated-side sequence control section so as to relay packets other than packets of a three-way handshake sent and received between the activating and activated communication lines on the one hand and have an exchange of the packets of the three-way handshake with the activated-side sequence control section on the other hand, and an activated-side packet storage section storing the data of the packets of the three-way handshake sent and received between the activated-side packet relay section and the activated-side sequence control section, wherein (i) when a SYN packet of a first three-way handshake addressed to the activated communication terminal device is generated by the activating communication terminal device, relayed through the activating-side authentication unit, outputted to the activating communication line, reached the activated communication line and received by the activated-side authentication unit, the SYN packet is relayed through the activated-side authentication unit and received by the activated communication terminal device, (ii) a SYN+ACK packet of the first three-way handshake as a response to the SYN packet is generated by the activated communication terminal device, relayed through the activated-side authentication unit, outputted to the activated communication line, reached the activating communication line and stored in the activating-side authentication unit, (iii) when an ACK packet of the first three-way handshake as a response to the SYN+ACK packet is generated by the activating-side authentication unit instead of the activating communication terminal device, reached the activated communication line, received by the activated-side authentication unit and thereby a connection by the first three-way handshake is established between the activating and activated communication lines, the connection is disconnected without data communication between the activating and activated communication terminal devices, (iv) a SYN packet of a second three-way handshake is sent from the activated-side authentication unit to the activating communication line within a predetermined time after the disconnection, (v) when the SYN packet is reached the activating communication line and received by the activating-side authentication unit, and the activating-side authentication unit determines that an identification number indicated by the SYN packet corresponds to the identification number of the communication line by which the activating communication line has been activated at the connection by the first three-way handshake and the reception of the SYN packet is done within the predetermined time after the disconnection, the activating-side authentication unit authorizes the activated communication line as true and sends a SYN+ACK packet of the second three-way handshake as a response to the SYN packet to the communication line from which the SYN packet is sent, (vi) when the SYN+ACK packet is reached the activated communication line and received by the activated-side authentication unit, the activated-side authentication unit authorizes the activating communication line as true and sends an ACK packet of the second three-way handshake as a response to the SYN+ACK packet to the communication line from which the SYN+ACK packet is sent, (vii) when the ACK packet is received by the activating-side authentication unit, the SYN+ACK packet of the first three-way handshake stored in the activating-side authentication unit is sent to the activating communication terminal device, (viii) an ACK packet of the first three-way handshake as a response to the SYN+ACK packet addressed to the activated communication terminal device is generated by the activating communication terminal device, and (ix) the ACK packet as a response to the SYN+ACK packet of the first three-way handshake is sent from the activated-side authentication unit to the activated communication terminal device, so that a connection is established again between the activating and activated communication lines so as to perform the data communication between the activating and activated communication terminal devices.

Effect of the Invention

According to the present invention, while a three-way handshake is executed once between activating and activated communication terminal devices, a three-way handshake is executed twice between the associated communication lines.

That is to say, when an activating communication line activates an activated communication line and a connection by a first three-way handshake is established between the activating and activated communication lines, the connection is disconnected without data communication. Then a SYN packet of a second three-way handshake is sent from the activated communication line to the activating communication line within a predetermined time after the disconnection and reached the activating communication line. When the SYN packet arrives at the activating communication line and an identification number indicated by the SYN packet corresponds to the identification number of the communication line by which the activating communication line has been activated at the connection by the first three-way handshake and the reception of the SYN packet is done within the predetermined time after the disconnection, the activated communication line is authorized as true and a SYN+ACK packet of the second three-way handshake is sent from the activating communication line to the communication line from which the SYN packet has been sent.

When the SYN+ACK packet arrives at the activated communication line, the activating communication line is authorized as true and an ACK packet of the second three-way handshake is sent from the activated communication line to the communication line from which the SYN+ACK packet has been sent. Thereby a connection by the second three-way handshake is established between the activating and activated communication lines and the data communication is performed between the activating and activated communication terminal devices.

Thus a secure data communication in an IP network can be achieved by a simple and low-cost configuration without a complicated and high-cost configuration such as the generation of the authentication key and the encryption and so on.

Also, a conventional data communication in an IP network becomes more secure by sending an authentication key based on the data communication method of the present invention instead of a conventional method of certifying devices by generating an authentication key at every communication.

Furthermore, a general-purpose communication system or a large scale data system becomes more secure by performing mutual authentication according to the present invention when data of the system to be protected or a memory area of the system to be protected is accessed.

BEST MODE FOR CARRYING OUT THE INVENTION

A preferred embodiment of the present invention will be explained below with reference to accompanying drawings.

Figure 1:
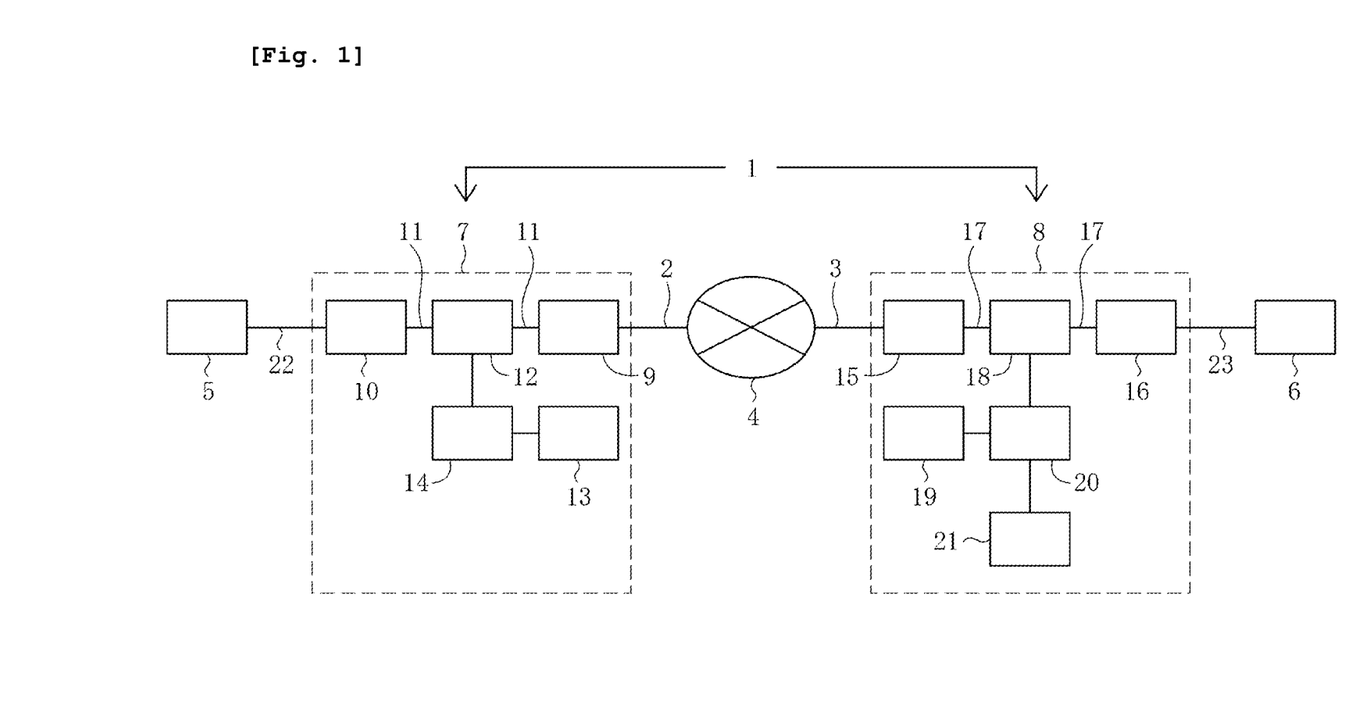
FIG. 1 is a figure illustrating a schematic structure of a communication line mutual authentication system in an IP network according to an embodiment of the present invention.

FIG. 1 is a figure illustrating a schematic structure of a communication line mutual authentication system in an IP network according to an embodiment of the present invention.

Referring to FIG. 1, the system 1 of the present invention is arranged between activating and activated communication terminal devices 5, 6 which are connected to an IP network 4 through communication lines 2, 3 with unique identification numbers and uniquely connected to each other by a three-way handshake based on the identification numbers.

As shown in FIG. 1, the system 1 comprises an activating-side authentication unit 7 arranged between the activating communication terminal device 5 and the activating communication line 2 so as to authenticate the activated communication line 3, and an activated-side authentication unit 8 arranged between the activated communication terminal device 6 and the activated communication line 3 so as to authenticate the activating communication line 2.

The activating-side authentication unit 7 has an activating-side line input/output section 9 connected to the activating communication line 2 so as to communicate with the activating communication line 2, and an activating-side terminal input/output section 10 connected to the activating communication terminal device 5 through a terminal line 22 so as to communicate with the activating communication terminal device 5.

The activating-side authentication unit 7 also has an activating-side sequence control section 14 controlling a three-way handshake sequence between the activating and activated communication lines 2, 3 and authenticating the activated communication line 3, and an activating-side packet relay section 12 arranged at a bus 11 which connects the activating-side line input/output section 9 and the activating-side terminal input/output section 10, and connected to the activating-side sequence control section 14 so as to relay packets other than packets of a three-way handshake sent and received between the activating and activated communication lines 2, 3 on the one hand and have an exchange of the packets of the three-way handshake with the activating-side sequence control section 14 on the other hand.

The activating-side authentication unit 7 further has an activating-side packet storage section 13 storing the data of the packets of the three-way handshake sent and received between the activating-side packet relay section 12 and the activating-side sequence control section 14.

The activated-side authentication unit 8 has an activated-side line input/output section 15 connected to the activated communication line 3 so as to communicate with the activated communication line 3, and an activated-side terminal input/output section 16 connected to the activated communication terminal device 6 through a terminal line 23 so as to communicate with the activated communication terminal device 6.

The activated-side authentication unit 8 also has an activated-side sequence control section 20 controlling a three-way handshake sequence between the activating and activated communication lines 2, 3 and authenticating the activating communication line 2, and an activated-side packet relay section 18 arranged at a bus 17 which connects the activated-side line input/output section 15 and the activated-side terminal input/output section 16, and connected to the activated-side sequence control section 20 so as to relay packets other than packets of a three-way handshake sent and received between the activating and activated communication lines 2, 3 on the one hand and have an exchange of the packets of the three-way handshake with the activated-side sequence control section 20 on the other hand.

The activated-side authentication unit 8 further has an activated-side packet storage section 19 storing the data of the packets of the three-way handshake sent and received between the activated-side packet relay section 18 and the activated-side sequence control section 20, and an IP address storage section 21 in which IP addresses of communication lines of activating communication terminal devices allowed to communicate with the activated communication terminal device are registered in advance.

Figure 2:
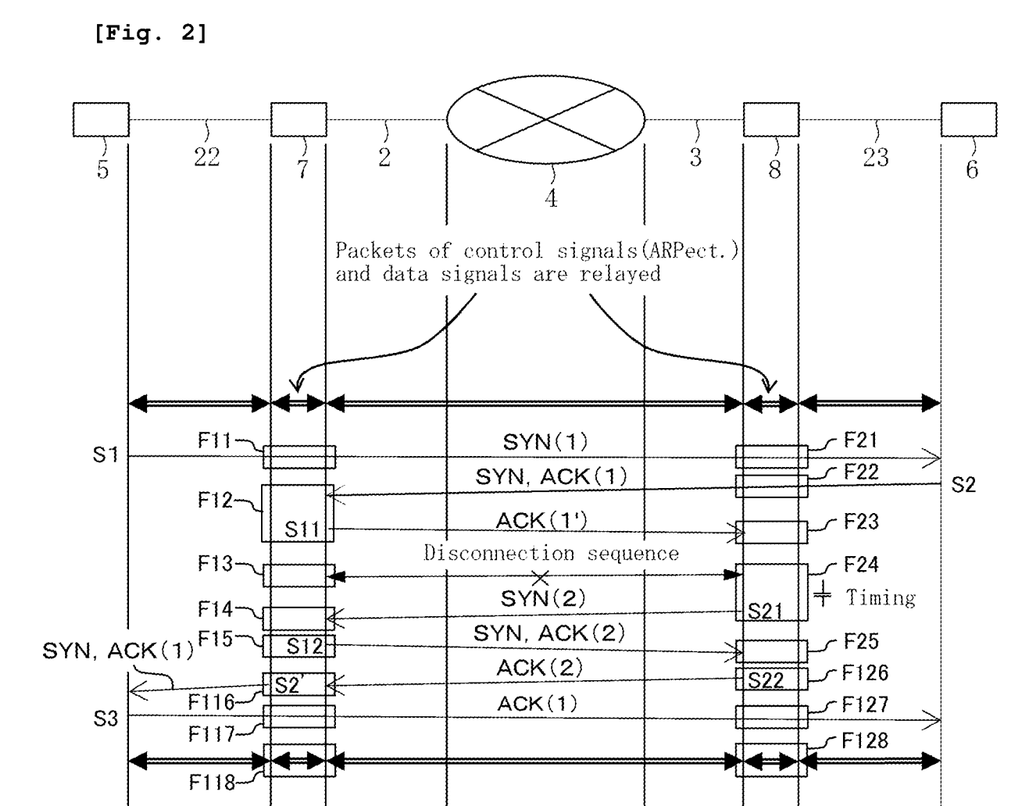
FIG. 2 is a sequence diagram of an example of a three-way handshake sequence of the system shown in FIG. 1.

FIG. 2 is a sequence diagram of an example of a three-way handshake sequence of the system shown in FIG. 1.

Referring to FIGS. 1 and 2, at first, a SYN packet [SYN(1)] addressed to the activated communication terminal device 6 is generated by the activating communication terminal device 5 (S1 of FIG. 2) and inputted into the terminal input/output section 10 of the activating-side authentication unit 7.

The SYN(1) is relayed through the packet relay section 12 and outputted from the line input/output section 9 to the activating communication line 2, and the data of the SYN(1)

is stored in the packet storage section 13 through the packet relay section 12 and the sequence control section 14 (F11 of FIG. 2).

The SYN(1) is reached the activated communication line 3 and inputted into the line input/output section 15 of the activated-side authentication unit 8, and the data of the SYN(1) is stored in the packet storage section 19 through the packet relay section 18 and the sequence control section 20.

In this embodiment, further, the sequence control section 20 determines whether a source IP address indicated by the SYN(1) is registered or not. When it is determined that the source IP address is registered, the SYN(1) is relayed through the packet relay section 18, outputted from the terminal input/output section 16 and received by the activated communication terminal device 6 (F21 of FIG. 2). On the other hand, when it is determined that the source IP address is not registered, the SYN(1) is not outputted to the terminal line 23 at all, so that the first three-way handshake is disconnected.

Next, a SYN+ACK packet [SYN+ACK(1)] of the first three-way handshake as a response to the SYN(1) is generated by the activated communication terminal device 6 (S2 of FIG. 2). The SYN+ACK(1) is inputted into the terminal input/output section 16, relayed through the packet relay section 18 and outputted from the line input/output section 15 to the activated communication line 3, and the data of the SYN+ACK(1) is stored in the packet storage section 19 through the packet relay section 18 and the sequence control section 20 (F22 of FIG. 2).

The SYN+ACK(1) is reached the activating communication line 2 and inputted into the line input/output section 9 of the activating-side authentication unit 7, and the data of the SYN+ACK(1) is stored in the packet storage section 13 through the packet relay section 12 and the sequence control section 14.

Then an ACK packet [ACK(1')] of the first three-way handshake as a response to the SYN+ACK(1) is generated by the sequence control section 14 instead of the activating communication terminal device 5 (S11 of FIG. 2), relayed through the packet relay section 12 and outputted from the line input/output section 9 to the activating communication line 2 (F12 of FIG. 2). The ACK(1') is generated based on the data of the SYN(1) and SYN+ACK(1) stored in the packet storage section 13.

The ACK(1') is reached the activated communication line 3 and inputted into the line input/output section 15 of the activated-side authentication unit 8, and the data of the ACK(1') is stored in the packet storage section 19 through the packet relay section 18 and the sequence control section 20. The ACK(1') is received by the sequence control section 20 instead of the activated communication terminal device 6. Thereby a connection by the first three-way handshake is established between the activating and activated communication lines 2, 3 (F23 of FIG. 2).

When this connection is established, the connection is disconnected without data communication between the activating and activated communication terminal devices (F13, F24 of FIG. 2), and within a predetermined time after the disconnection, a SYN packet [SYN(2)] of a second three-way handshake addressed to the activating communication line 2 is generated by the sequence control section 20 of the activated-side authentication unit 8 (S21 of FIG. 2) and outputted from the packet relay section 18 to the activated communication line 3 through the line input/output section 15 (F24 of FIG. 2). At this time, the data of the SYN(2) is stored in the packet storage section 19. The SYN(2) is generated based on the data of the SYN(1) and SYN+ACK (1) stored in the packet storage section 19.

The disconnection is executed by, for example, sending a FIN (an abbreviation of Finish) packet from the activated-side authentication unit 8 to the activating-side authentication unit 7, sending an ACK packet and a FIN packet one after the other from the activating-side authentication unit 7 to the activated-side authentication unit 8 and sending an ACK packet from the activated-side authentication unit 8 to the activating-side authentication unit 7, or the disconnection is executed by, for example, causing a timeout.

When the SYN(2) is reached the activating communication line 2 and inputted into the line input/output section 9 of the activating-side authentication unit 7 and the data of the SYN(2) is stored in the packet storage section 12 through the packet relay section 12 and the sequence control section 14, and the SYN(2) is received by the sequence control section 14 (F14 of FIG. 2), and the sequence control section 14 determines that an identification number indicated by the SYN(2) corresponds to the identification number of the communication line by which the activating communication line has been activated at the connection by the first three-way handshake and the reception of the SYN(2) is done within the predetermined time after the disconnection, the activated communication line 3 is authorized as true, so that a SYN+ACK packet of the second three-way handshake [SYN+ACK(2)] as a response to the SYN(2) is sent from the sequence control section 14 to the communication line from which the SYN(2) has been sent S12 of FIG. 2), relayed through the packet relay section 12 and outputted from the line input/output section 9 to the activating communication line 2 (F15 of FIG. 2), and the data of the SYN+ACK(2) is stored in the packet storage section 13.

At this time, if the first establishment of connection is based on activation to a true communication line from a false communication device which impersonates another true communication line, a true communication terminal device of the impersonated communication line does not have the information about the activation, so that the true communication terminal device of the impersonated communication line destroys the arrived SYN(2) and does not respond to the arrived SYN(2) so as not to send the SYN+ACK(2).

Accordingly, the activated communication terminal device is connected to neither the true communication terminal device of the impersonated communication line nor the false communication terminal device.

The SYN+ACK(2) is reached the activated communication line 3 and inputted into the line input/output section 15 of the activated-side authentication unit 8, and the data of the SYN+ACK(2) is stored in the packet storage section 19 through the packet relay section 18 and the sequence control section 20. When the SYN+ACK (2) is received by the sequence control section (F25 of FIG. 2), the activating communication line 2 is authorized as true by the sequence control section 20, and the sequence control section 20 generates an ACK packet of the second three-way handshake [ACK(2)] as a response to the SYN+ACK(2) addressed to the communication line from which the SYN+ACK(2) has been sent (S22 of FIG. 2), and the ACK(2) is outputted from the line input/output section 15 to the activated communication line 3 through the packet relay section 18 (F126 of FIG. 2). At this time, the data of the ACK(2) is stored in the packet storage section 19.

When the ACK(2) is reached the activating communication line 2 and inputted into the line input/output section 9 of the activating-side authentication unit 7, and the data of the ACK(2) is stored in the packet storage section 13 through the packet relay section 12 and the sequence control section 14, and the ACK(2) is received by the sequence control section 14, a SYN+ACK packet [SYN+ACK(1)] of the first three-way handshake addressed to the activating communication terminal device generates (S2' of FIG. 2), and the SYN+ACK(1) is relayed through the packet relay section 12 and outputted from the terminal input/output section 10 to the activating communication terminal device 5 (F116 of FIG. 2). The SYN+ACK (1) has been stored in the packet storage section 13 (F12 of FIG. 2).

When the SYN+ACK(1) is received by the activating communication terminal device 5, the activating communication terminal device 5 generates an ACK(1) as a response to the SYN+ACK(1) addressed to the activated communication terminal device 6 (S3 of FIG. 2) and the ACK(1) is inputted into the terminal input/output section 10 of the activating-side authentication unit 7. The ACK(1) is further relayed through the packet relay section 12 and outputted from the line input/output section 9 to the activating communication line 2 (F117 of FIG. 2). At this time, the data of the ACK(1) is stored in the sequence control section 14.

The ACK(1) is reached the activated communication line 2 and inputted into the line input/output section 15 of the activated-side authentication unit 8, and the data of the ACK(1) is stored in the packet storage section 19 through the packet relay section 18 and the sequence control section 20. The ACK(1) is relayed through the packet relay section 18 and outputted from the terminal input/output section 16 to the activated communication terminal device 6 (F127 of FIG. 2), and received by the activated communication terminal device 6.

Thereby a connection is established again between the activating-side and activated-side terminal lines 22, 23 and the data communication is performed between the activating and activated communication terminal devices 5, 6 (F118 and F128 of FIG. 2)

Figure 3:
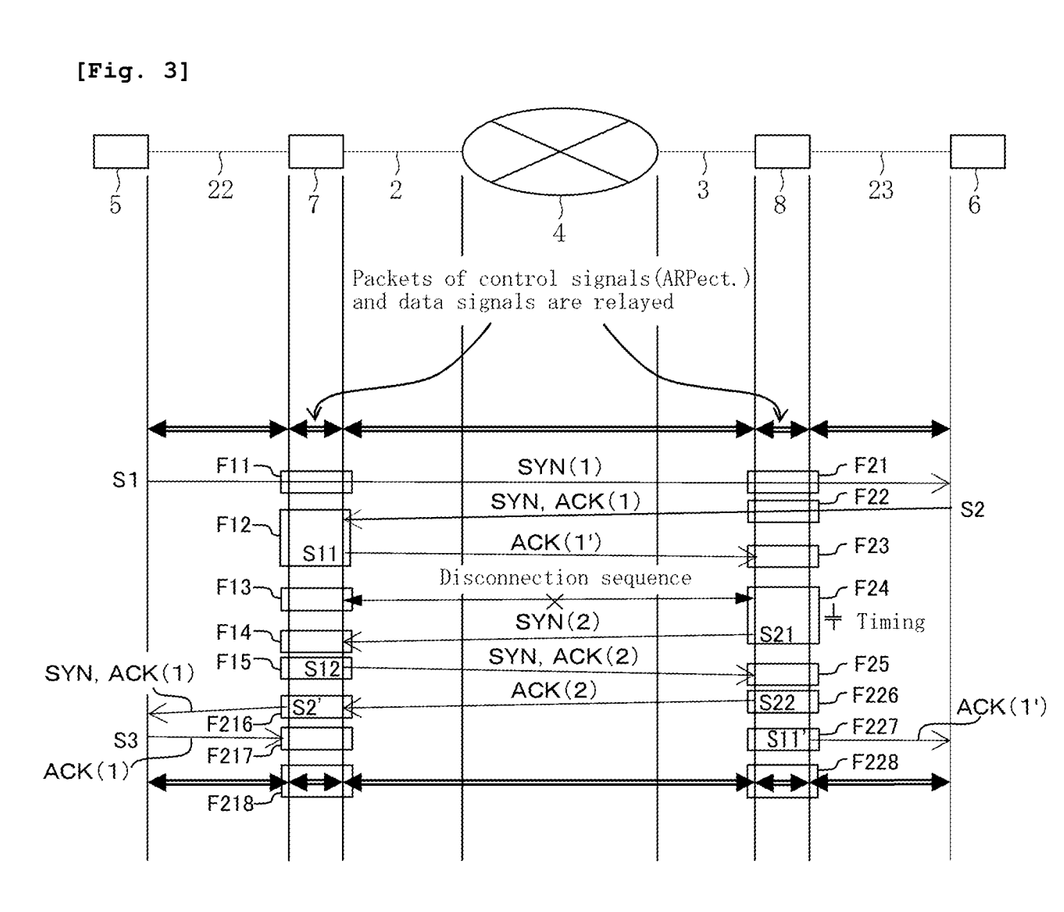
FIG. 3 is a sequence diagram of another example of the three-way handshake sequence of the system shown in FIG. 1.

FIG. 3 is a sequence diagram of another example of the three-way handshake sequence of the system shown in FIG. 1.

The three-way handshake sequence shown in FIG. 3 differs from the three-way handshake sequence shown in FIG. 1 only in steps of transmitting an ACK packet between the activating and activated communication terminal devices 5, 6. Therefore, in FIG. 3, the same components as those shown in FIG. 2 are designated by the same reference numerals, and their detailed description is omitted in the following.

Referring to FIG. 3, in this sequence, the ACK packet of the first three-way handshake [ACK(1')] is stored (F23 of FIG. 3), and when the SYN+ACK(2) is sent from the line input/output section 15 of the activated-side authentication unit 8 to the sequence control section 20 through the packet relay section 18 (F25 of FIG. 3), the activating communication line 2 is authorized as true by the sequence control section 20 so that the sequence control section 20 generates the ACK(2) as a response to the SYN+ACK(2) addressed to the communication line from which the SYN+ACK(2) has been sent (S22 of FIG. 3) and the ACK(2) is outputted from the line input/output section 15 to the activated communication line 3 (F226 of FIG. 3).

When the ACK(2) is reached the activating communication line 2 and inputted into the line input/output section 9 of the activating-side authentication unit 7, and the data of the ACK(2) is stored in the packet storage section 13 through the packet relay section 12 and the sequence control section 14 and the ACK(2) is received by the sequence control section 14, the sequence control section 14 sends the SYN+ACK(1) of the first three-way handshake which has been stored (F12 of FIG. 3) to the activating communication terminal device 5, and the SYN+ACK(1) is relayed through the packet relay section 12 and outputted from the terminal input/output section 10 to the activating communication terminal device 5 (F216 of FIG. 3).

When the SYN+ACK(1) is received by the activating communication terminal device 5, the activating communication terminal device 5 generates the ACK(1) as a response to the SYN+ACK(1) addressed to the activated communication terminal device 6 (S3 of FIG. 3), and the ACK(1) is inputted into the terminal input/output section 10 of the activating-side authentication unit 7 and received by the sequence control section 14 through the packet relay section 12 (F217 of FIG. 3).

On the other hand, in the activated-side authentication unit 8, after the sequence control section 20 generates the ACK(2) (S22 of FIG. 3, F226 of FIG. 3), the sequence control section 20 sends the ACK(1') which has been stored (F23 of FIG. 3) to the activated communication terminal device 6 (S11' of FIG. 3), and the ACK(1') is relayed through the packet relay section 18 and outputted from the terminal input/output section 16 to the activated communication terminal device 6 (F227 of FIG. 3). Then a connection is established again between the activating-side and activated-side terminal lines 22, 23 and thereby, the data communication is performed between the activating and activated communication terminal devices 5, 6 (F218 and F228 of FIG. 3).

According to the system of the present invention, while a three-way handshake is executed once between communication terminal devices, a three-way handshake is executed twice between the associated communication lines and, when one communication line activates the other communication line and a connection by a three-way handshake is established between those communication lines, the connection is disconnected once, and thereafter, it is determined at the activating communication line if a callback signal (SYN packet) from the activated communication line arrives or not on the one hand and it is determined at the activated communication line if a response signal (ACK+SYN packet) from the activating communication line as a response to the callback signal (SYN packet) which has been sent to the activating communication line at a predetermined timing arrives or not, and thereby it is possible to easily and surely determine on both the activating side and activated side if there is impersonation of communication line. Then data communication is performed between the connected communication terminal devices only when both the activating and activated communication lines are validated.

Thus a secure data communication in an IP network can be achieved by a simple and low-cost configuration without a complicated and high-cost configuration such as the generation of the authentication key and the encryption and so on.

Although the present invention has been explained based on a preferred embodiment thereof, the present invention is not limited to the embodiment and one skilled in the art can easily devise various modified embodiments within the scope of the claims of the present application.

For example, although the identification number registered beforehand in an identification number storage section consists of one or more IP addresses in the above-mentioned embodiment, the identification number may be composed of a combination of an IP address and a port number depending on the application and implementation of the present invention.

For example, although the activated-side authentication unit 8 has the identification number storage section 21 so as to restrict communication with third parties or unnecessary communication lines in the above-mentioned embodiment, the activated-side authentication unit 8 may not have the identification number storage section 21.

In this configuration, the SYN(1) is reached the activated communication line 3 and inputted into the line input/output section 15 of the activated-side authentication unit 8, and the data of the SYN(1) is stored in the packet storage section 19 through the packet relay section 18 and the sequence control section 20. The SYN(1) is relayed through the packet relay section 18 and inputted from the terminal input/output section 16 to the activated communication terminal device 6 (F21 of each of FIGS. 2 and 3).

Here, when a function of restriction of communication with third parties or unnecessary communication lines is required, the communication terminal device 6 connected to the terminal line 23 has the identification number storage section 21.

Although the system of the present invention is applied to one-to-one communication in an IP network in the above-mentioned embodiment, the system of the present invention may be applied to one-to-many or many-to-many or multiple simultaneous communications in the IP network.

In this case, an identification number consists of an IP address and a port number, and the communication (session, a flow from connection to disconnection in individual communication) can be distinguished by the identification number so that the multiple simultaneous communications are achieved.

Thereby, for example, when the communication device of the activating communication line is a central communication device and the communication devices of the activated communication lines are communication terminals, an M2M system can be composed of the central communication device and communication terminals each of which is connected to the central communication device through the IP network. In this case, according to the present invention, the communication terminals are protected from unauthorized access and the central communication device can provide to each of the communication terminals communication protected from unauthorized access.

In addition, when the communication device on the activating side is the central communication device, the central communication device can detect an activation of a third party impersonating the central communication device and accordingly, a safe operation of the communication system is achieved.

In this embodiment, different identification numbers can be used for each application at the central communication device. For example, identification number for receiving a report of detection of unauthorized access from a communication terminal device, or identification number for checking operation status of a communication terminal device at maintenance and inspection, or identification number for switching operation mode of a communication terminal device can be used besides the identification number for normal activation. In this case, those identification numbers are assigned to the communication terminal device.

Furthermore, to improve maintainability of an IoT system and so on, a plurality of identification numbers are assigned to a communication line of a central communication device, and the corresponding identification number is assigned to each of communication lines of communication terminal devices or each of groups of communication lines of communication terminal devices, and at closing or abolishing the communication line of the communication terminal device, the corresponding identification number is deleted from the communication line of the central communication device so as to stop the communication terminal device or close the communication line of the communication terminal device.

The system of the present invention can be applied to the high-speed and large-capacity data communication between computers.

Also, in the system of the present invention, the risk of leakage or decryption of an authentication key resulted from long-term use of the authentication key is avoided by issuing (giving) the authentication key (one-time password) that is valid only once.

Alternatively, the decryption itself can be prevented by encrypting data to be transmitted and transmitting a part of the encrypted data by the system of the present invention.

It is also possible that the activating-side and activated-side authentication units are integrated with the activating and activated communication terminal devices, respectively in a manner such that the activating and activated communication terminal devices have functions of the activating-side and activated-side authentication units, respectively.

In addition, the present invention can be applied to the case that the communication terminal device is activated and connected in both directions, where the authentication unit has both functions of the activating-side and activated-side authentication units.

In this case, different two IP addresses, which are an IP address for activation and an IP address for reception are set in an activating-side part or an activated-side part of the authentication unit because the activating-side part of the authentication unit cannot determine whether a SYN packet received by the activating-side part is associated with call back communication or new communication when the same IP address is used.

REFERENCE NUMERALS

1 System
2 Activating communication line
3 Activated communication line
4 IP network
5 Activating communication terminal device
6 Activated communication terminal device
7 Activating-side authentication unit
8 Activated-side authentication unit
9 Activating-side line input/output section
10 Activating-side terminal input/output section
11 Bus
12 Activating-side packet relay section
13 Activating-side packet storage section
14 Activating-side sequence control section
15 Activated-side line input/output section
16 Activated-side terminal input/output section
17 Bus
18 Activated-side packet relay section
19 Activated-side packet storage section
20 Activated-side sequence control section
21 Identification number storage section
22, 23 Terminal line

The invention claimed is:

1. A system authenticating mutual communication lines between activating and activated communication terminal devices which are connected to an IP network through the communication lines with unique identification numbers and uniquely connected to each other by a three-way handshake based on the identification numbers, wherein the system comprises:
  an activating-side authentication engine including a memory and arranged between an activating communication terminal device and an activating communication line so as to authenticate an activated communication line; and
  an activated-side authentication engine including a memory and arranged between the activated communication terminal device and the activated communication line so as to authenticate the activating communication line;
  wherein the activating-side authentication engine has
  an activating-side line input/output engine connected to the activating communication line so as to communicate with the activating communication line,
  an activating-side terminal input/output engine connected to the activating communication terminal device so as to communicate with the activating communication terminal device,
  an activating-side sequence control engine controlling a three-way handshake sequence between the activating and activated communication lines and authenticating the activated communication line,
  an activating-side packet relay engine arranged at a bus which connects the activating-side line input/output engine and the activating-side terminal input/output engine, and connected to the activating-side sequence control engine so as to relay packets other than packets of a three-way handshake sent and received between the activating and activated communication lines on the one hand and have an exchange of the packets of the three-way handshake with the activating-side sequence control engine on the other hand, and
  an activating-side packet storage engine storing the data of the packets of the three-way handshake sent and received between the activating-side packet relay engine and the activating-side sequence control engine;
  wherein the activated-side authentication engine has
  an activated-side line input/output engine connected to the activated communication line so as to communicate with the activated communication line,
  an activated-side terminal input/output engine connected to the activated communication terminal device so as to communicate with the activated communication terminal device,
  an activated-side sequence control engine controlling a three-way handshake sequence between the activating and activated communication lines and authenticating the activating communication line,
  an activated-side packet relay engine arranged at a bus which connects the activated-side line input/output engine and the activated-side terminal input/output engine, and connected to the activated-side sequence control engine so as to relay packets other than packets of a three-way handshake sent and received between the activating and activated communication lines on the one hand and have an exchange of the packets of the three-way handshake with the activated-side sequence control engine on the other hand, and
  an activated-side packet storage engine storing the data of the packets of the three-way handshake sent and received between the activated-side packet relay engine and the activated-side sequence control engine;
  wherein (i) when a synchronize (SYN) packet of a first three-way handshake addressed to the activated communication terminal device is generated by the activating communication terminal device, relayed through the activating-side authentication engine, outputted to the activating communication line, reached the activated communication line and received by the activated-side authentication engine, the SYN packet is relayed through the activated-side authentication engine and received by the activated communication terminal device, (ii) a synchronize-acknowledge (SYN+ACK) packet of the first three-way handshake as a response to the SYN packet is generated by the activated communication terminal device, relayed through the activated-side authentication engine, outputted to the activated communication line, reached the activating communication line and stored in the activating-side authentication engine, (iii) when an acknowledgment (ACK) packet of the first three-way handshake as a response to the SYN+ACK packet is generated by the activating-side authentication engine instead of the activating communication terminal device, reached the activated communication line, received by the activated-side authentication engine and thereby a connection by the first three-way handshake is established between the activating and activated communication lines, the connection is disconnected without data communication between the activating and activated communication terminal devices, (iv) a SYN packet of a second three-way handshake is sent from the activated-side authentication engine to the activating communication line within a predetermined time after the disconnection, (v) when the SYN packet is reached the activating communication line and received by the activating-side authentication engine, and the activating-side authentication engine determines that an identification number indicated by the SYN packet corresponds to the identification number of the communication line by which the activating communication line has been activated at the connection by the first three-way handshake and the reception of the SYN packet is done within the predetermined time after the disconnection, the activating-side authentication engine authorizes the activated communication line as true and sends a SYN+ACK packet of the second three-way handshake as a response to the SYN packet to the communication line from which the SYN packet has been sent, (vi) when the SYN+ACK packet is reached the activated communication line and received by the activated-side authentication engine, the activated-side authentication engine authorizes the activating communication line as true and sends an ACK packet of the second three-way handshake as a response to the SYN+ACK packet to the communication line from which the SYN+ACK packet has been sent, (vii) when the ACK packet is received by the activating-side authentication engine, the SYN+ACK packet of the first three-way handshake stored in the activating-side authentication engine is sent to the activating communication terminal device, (viii) an ACK packet of the first three-way handshake as a response to the SYN+ACK packet addressed to the activated communication terminal device is generated by the activating communication terminal device, and (ix) the ACK packet as a response to the SYN+ACK packet of the first three-way handshake is sent from the activated-side authentication engine to the activated communication terminal device, so that a connection is established again between the activating and activated communication lines so as to perform the data communication between the activating and activated communication terminal devices.

\* \* \* \* \*